(12) United States Patent
Howle

(10) Patent No.: US 8,652,219 B1
(45) Date of Patent: *Feb. 18, 2014

(54) POWDERED DYE MATERIAL FOR CONCRETE SURFACES

(75) Inventor: Clint Howle, Springdale, AR (US)

(73) Assignee: Ameripolish, Inc., Lowell, AR (US)

( * ) Notice: Subject to any disclaimer, the term of this patent is extended or adjusted under 35 U.S.C. 154(b) by 379 days.

This patent is subject to a terminal disclaimer.

(21) Appl. No.: 11/709,617

(22) Filed: Feb. 22, 2007

Related U.S. Application Data

(60) Provisional application No. 60/775,514, filed on Feb. 22, 2006.

(51) Int. Cl.
*D06P 3/80* (2006.01)
*C09B 67/02* (2006.01)

(52) U.S. Cl.
USPC ............... 8/522; 8/661; 8/662; 8/636; 8/498; 8/527; 8/524

(58) Field of Classification Search
USPC .................... 8/661, 662, 636, 498, 527, 524; 428/511
See application file for complete search history.

(56) References Cited

U.S. PATENT DOCUMENTS

| | | | | |
|---|---|---|---|---|
| 4,162,348 | A | * | 7/1979 | Juzu et al. .................. 428/416 |
| 5,476,722 | A | | 12/1995 | Sakamoto et al. ........... 428/511 |
| 5,534,214 | A | | 7/1996 | Sakamoto et al. ........... 264/333 |
| 6,388,002 | B1 | * | 5/2002 | Baker et al. .................. 524/608 |
| 6,443,996 | B1 | * | 9/2002 | Mihelich et al. .............. 8/522 |
| 2001/0032567 | A1 | * | 10/2001 | Ikoma ....................... 106/31.58 |

FOREIGN PATENT DOCUMENTS

| | | | | |
|---|---|---|---|---|
| GB | 1529062 | A | * | 10/1978 |
| JP | 09111152 | A | * | 4/1997 |

OTHER PUBLICATIONS

Derwent Abstract Acc. No. 1997-295161, English abstract for JP09111152A.*
"Ethylene glycol monobutyl ether" entry in Hawley's Condensed Chemical Dictionary, 14th edition, copyright 2002 by John Wiley & Sons, Inc., accessed on Knovel web portal.*
"Butyl cellosolve solvent" entry in Knovel Solvents—A Properties Database, copyright 2008 by ChemTec Publishing, accessed on Knovel web portal.*

* cited by examiner

*Primary Examiner* — Harold Pyon
*Assistant Examiner* — Katie L Hammer
(74) *Attorney, Agent, or Firm* — Isaac A. Angres

(57) ABSTRACT

The invention herein provides for an improved dye material composed of a dry particulate mixture of azo and phthalocyanine dyes for concrete surface applications.

15 Claims, 2 Drawing Sheets

POWDERED DYE MATERIAL FOR CONCRETE SURFACES

CROSS-REFERENCE TO RELATED APPLICATIONS

This application claims priority to and is a continuation-in-part of U.S. application Ser. No. 60/775,514, filed Feb. 22, 2006.

STATEMENT REGARDING FEDERALLY SPONSORED RESEARCH OR DEVELOPMENT

Not Applicable.

REFERENCE TO A MICROFICHE APPENDIX

Not Applicable.

FIELD OF THE INVENTION

The invention relates to dye material used for treating existing surfaces, such as cured concrete. In particular, the invention pertains to powder dye material used for treating a variety of surfaces including concrete. Known art may be found in U.S. Class 428, subclass 511 and others.

BACKGROUND OF THE INVENTION

Hazardous base dye compositions have been employed in the construction field to apply single colors and textures during the formation of surfaces. Similar technology has also been used to apply chemical formulas to create a desired finish upon a cured concrete surface. In the past, these dye materials have been limited to a single color base that included hazardous materials which complicate the shipping of these materials. Thus, shipping of multiple colors or combining colors required multiple hazardous material shipments. Furthermore, this created problems in adapting to varying color surfaces because adjustment could not be easily made to the formulation being applied. Additionally, the past dye formulations had a limited shelf-life that required concurrent ordering of the hazardous material dyes with the job such that custom coloring could not be easily provided. Thus, there is an overwhelming need in the art to provide an easily-transportable dye material that is not considered a hazardous material that also has an extended shelf-life. Furthermore, there is a need for the ability to provide materials that may be custom blended at the job site without the waste associated with prior art methods.

U.S. Pat. No. 4,162,348 to Juzu et al. shows a method for coloring inorganic substrates such as glass beads, glass fibers, mineral wool, rock wool, mineral fiber boards and cloths, concrete molded materials, inorganic pigments and metallic powders, which comprises treating the inorganic substrate with (1) a cationic component comprising (a) a water soluble cationic resin or an aqueous solution of a water soluble cationic resin, (b) an aqueous solution of a water soluble cationic resin and a water soluble cationic dye, or (c) an aqueous dispersion of a water soluble cationic resin, a cationic dispersing agent plus a water insoluble dye or pigment and, optionally, a cationic water soluble dye; and With (2) an anionic component comprising (d) an aqueous solution of a water soluble anionic dye, (e) an anionic dispersing agent or an aqueous solution of an anionic dispersing agent, (f) an aqueous solution of an anionic dispersing agent and a water soluble anionic dye, or (g) an aqueous dispersion of an anionic dispersing agent plus a water insoluble dye or pigment and, optionally, an anionic water soluble dye with the order of treatment with the cationic component (1) and the anionic component (2) being optional and with at least one of the cationic component (1) or the anionic component (2) containing a dye, either water soluble or water insoluble, or pigment as a colorant.

U.S. Pat. No. 5,476,722 to Sakamoto et al. shows a concrete coloring material and a process for coloring concrete by means of such a concrete coloring material capable of permitting concrete to exhibit natural color or aesthetic properties while preventing concrete from being substantially discolored. Polyethylene oxide is used as a water-soluble adhesive or glue. The oxide is mixed with a composition such as dye, pigment, a mixture thereof or the like, to thereby permit the composition to penetrate into the concrete.

U.S. Pat. No. 5,534,214 to Sakamoto et al. shows a concrete coloring material and a process for coloring concrete by means of such a concrete coloring material capable of permitting concrete to exhibit natural color or aesthetic properties while preventing concrete from being substantially discolored. Polyethylene oxide is used as a water-soluble adhesive or glue. The oxide is mixed with a composition such as dye, pigment, a mixture thereof or the like, to thereby permit the composition to penetrate into the concrete.

The prior art fails to teach a dye material shipped in its powder form. Additionally, the prior art fails to teach a dye material with an extended shelf-life. Thus, there is a need in the art to provide a dye application that is easily transported, non-hazardous, with an extended shelf-life.

SUMMARY OF THE INVENTION

The invention provides for an improved dye material used to treat existing surfaces, namely, cured concrete. In particular, the powder dye material is transportable in a non-hazardous dry powder form which may be stored for an extended period and then custom mixed with an aqueous material for application to existing concrete surfaces. The improved dye material eliminates the voluminous, cumbersome, weighty packaging materials used with previous dye materials for concrete surfaces.

Further, the powder form dye material is an ideal for transportation and storage as it is non-hazardous and has an extended shelf-life. Packaging of the improved powder dye material is considerably more compact and lighter, allowing for more efficient shipping and storage of the dye material. This allows for multiple colors of dye to be easily transported for custom blending at the jobsite with the materials easily stored on the transportation vehicle with just a single transportation of a base liquid material that may or may not be hazardous.

An object of the present invention is to provide an improved dye material for treatment of existing surfaces.

Another object of the present invention is to provide a dye material that is easily transported.

Another object of the present invention is to provide a dye material which is compact and light.

Yet another object of the present invention is to provide a non-hazardous dye material.

A still further object of the present invention is to provide a method for providing on site custom blending without the multiple volumes of hazardous material required by the prior art.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention addresses a perceived need in the art for an improved dye material. In particular, the present invention discloses the use of a non-hazardous powder dye material for on site mixing with a base material for treatment of concrete surfaces.

Figure 2:
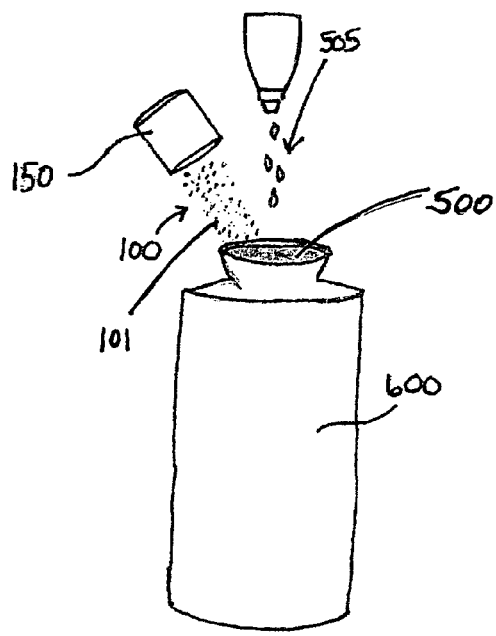
FIG. 2 is a drawing showing a step of the method of using the improved dye material.

FIG. 2 shows the main advantage of the present invention by showing the on site mixing of a dry powder dye material 100 with a chemical solution 500. The powder dye material in accordance with the present invention is generally indicated by reference numeral 100 in FIG. 2. The powder dye material 100 generally is added to an aqueous material 500 prior to application upon concrete surfaces. The aqueous material 500 may be include a variety of solvents, such as acetone or water.

Powder dye material 100, as shown in FIG. 2, is composed of a dry particulate 101 mixture of azo and phthalocyanine dyes. It is expected that the ratio of azo and phthalocyanine dyes in the dry particles 101 of the dye material 100 can be altered to create differing colors. For example, in a preferred embodiment, a deep green dye can be achieved by mixing yellow azo dye, red azo dye, and blue phthalocyanine dye. Specifically, for a five pound mixture 101 of deep green dye material 100 can be achieved by combining 945 grams of yellow azo dye, 378 grams of red azo dye, and 945 grams of blue phthalocyanine dye.

Figure 3:
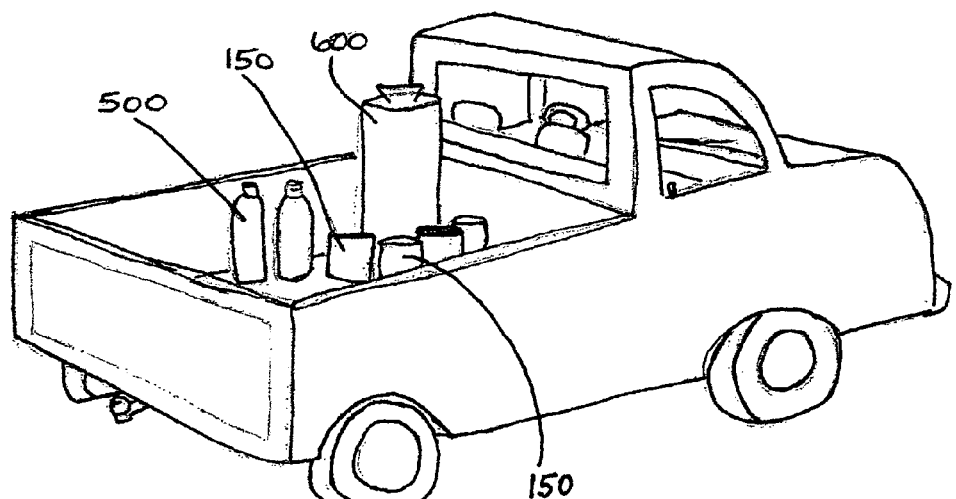
FIG. 3 is a drawing showing a step thereof.

As will be appreciated by one skilled in the art decorative concrete finishes may include many various colors requiring many differing dye materials. Also known is that concrete pads may have varying colors across their surfaces requiring the use of multiple color combinations to achieve a uniform dye effect. As shown in FIG. 3, the present invention provides for this capability while limiting the amount of aqueous material by providing a multitude of dye material 100 in a variety of colors that may be stored and shipped with a small volume of aqueous material 500. Alternatively, two shipments may be utilized wherein one is for the non-hazardous dye material and a second shipment is used for the aqueous material 500. This allows for multiple colors with just a single purchase and shipment of one amount of aqueous material 500.

As shown in FIG. 2, the present invention allows for a user to purchase and use smaller lightweight amounts of dry dye material 100 for mixing with one base aqueous material 500. This advantage allows users to save storage space and money while promoting efficiency in the industry. Dye material 100 is non-hazardous, allowing for a less costly method of shipment and storage than aqueous dye materials or alternatively, allowing for faster shipment, such as air shipment, tunnel shipments, or the like, of materials to provide better customer service. Further, dye material 100 does not contain the aqueous elements or hazardous chemicals used in the previous dye application until a few hours prior to surface application, so the powder dye material 100 is safer than hazardous dye materials which lowers the risk to all of society in the transportation of these materials.

The color of the dye material 100 may be easily modified by a user by combining various colors of dye material 100 to create custom colors. The improved dry dye material 100 allows for increased mixture of dye colors to create additional dye colors for applications. The present invention enables easier color customization by presenting a dye material 100 which is non-hazardous and easy to mix. Thus, users do not have to be concerned with chemical burns or other hazards while mixing the dye material 100.

As shown in FIG. 3, the dye material 100 is generally packaged in fluid-resistant bottles 150, drums or other similar containers in a variety of sizes. As shown by the transportation truck in FIG. 3, the packaged dye material 100 can be easily stored for extended periods of time as the dye material 100 has an unlimited shelf life. A perceived benefit of the powder dye material 100 is an improved efficiency in the industry through the extended life of the dye material 100. Past aqueous dye materials have a definite shelf-life allowing for waste in the industry.

Also shown in FIG. 3 is the effect of how the compact packaging of the powder dye material 100 allows for lighter, more efficient storage and shipping arrangements. Past dye materials have been cumbersome and weighty, as these materials include a hazardous aqueous solution. The present invention provides the powder dye material 100 for storage and shipping without the heavy aqueous element.

Figure 1:
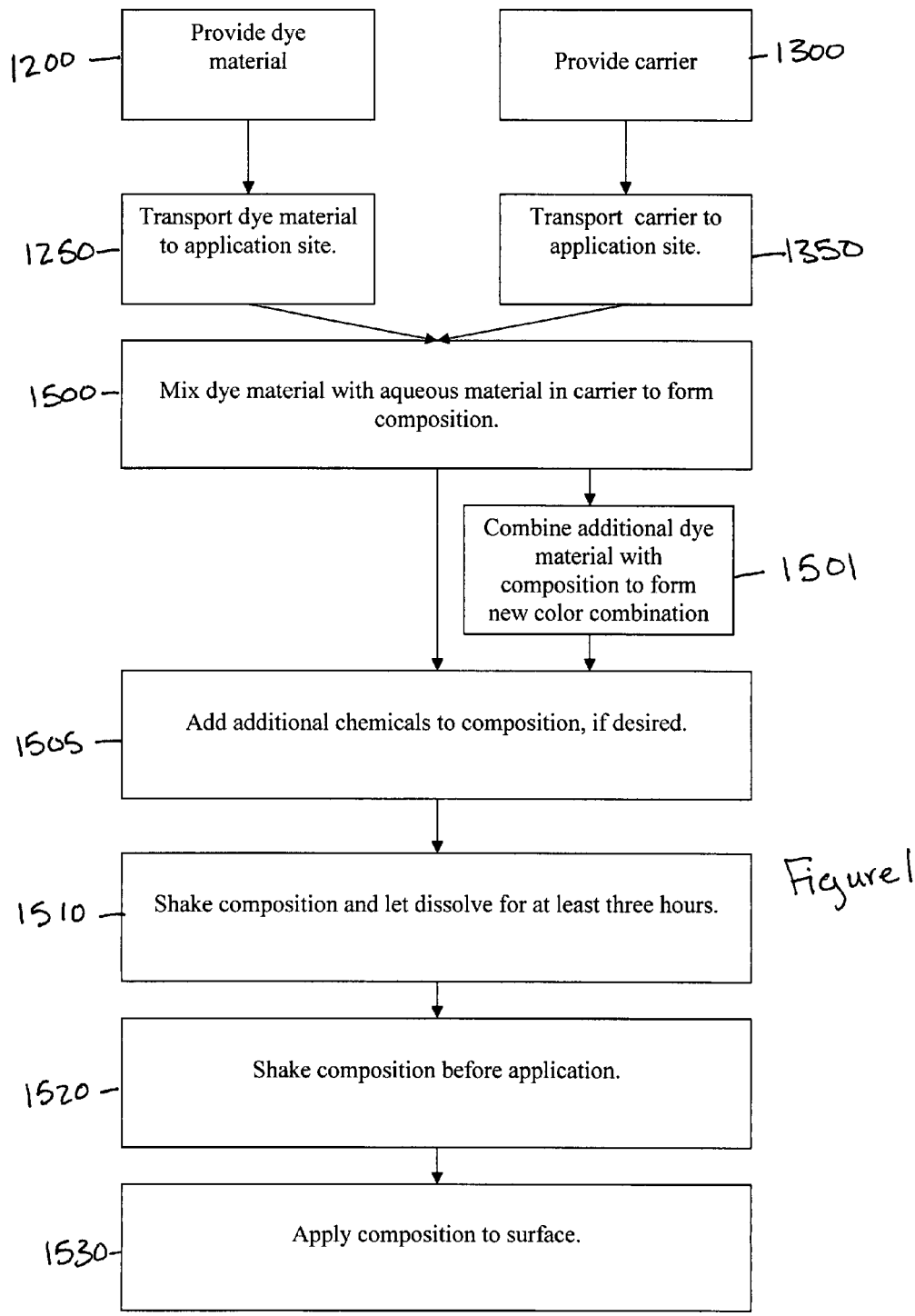
FIG. 1 is a flow chart illustrating a method of using the improved dye material.

As shown in FIG. 1, prior to modification of a surface, dye material 100 must be provided 1200 and transported 1250 to the work site. As discussed, dye material 100 may be transported 1250 easily to a work site since it is non-hazardous and compact. Additionally, multiple dye colors may be easily transported 1250 to the work site to allow for the use of multiple dye colors on the application surface or to allow for mixing of colors. As an example, a yellow dye and a blue dye may be mixed to form a green dye. It is envisioned that a series of base colors may be used to form any desired color similar to the mixing of food dyes commonly found in recipes or paint colors commonly found in hardware stores.

Prior to application to a surface, dye material 100 is mixed 1500 with aqueous material 500 in equal parts to create a dye composition 1000. Upon mixing 1500 with the aqueous material, the hue and color of the dye material 100 may be modified by adding differing colored dyes and more aqueous material. The user may modify the intensity of the hue of the dye composition by mixing more aqueous material 500 than dye material 100. The mixture of aqueous material 500 with the dye material 100 can be in small or large quantities based upon the anticipated use of the dye composition 1000. Specifically, the user can chose the amount of dye material 100 to mix 1500 based upon the desired amount of dye composition 1000. In another embodiment, a user may select to mix 1500 a multitude of sizes including one quart, one gallon, and five gallon increments for mixture with approximately 8-16 grams, 42-50 grams, and 226-234 grams by weight respectively.

The color of the dye material 100 can be tested by mixing a small amount, such as one gram of dye material 100 can be mixed 1500 with one milliliter of aqueous material 500 to create a small amount of dye composition 1000. This small amount of dye composition 1000 can then later be applied 1530 to a concrete surface to create a sample surface for inspection. It is envisioned that a sample amount of dye composition 1000 may be packaged separate from the dye material 100 in a pre-mixed, ready-to-apply application. Additionally, this sample amount may be packaged in an aerosol sprayer for easy application. Further, an advantage of the present invention is that small amounts of dye material 100 can be mixed 1500 for application to a portion of the work surface. In this manner, users can treat 1530 a portion of the work surface at one time allowing for greater flexibility in working and providing for adaptations necessary for the particular jobsite. The mixed dye composition 1000 will be fairly consistent with each mixed batch as the composition is contemporaneously mixed 1500 with a consistent ratio of dye material 100 and aqueous material 500.

As shown in FIG. 1, additional chemicals 505, such as a drying agent like butyl salisol, can be added 1505 to the mixed dye composition 1000 for some surface applications, such as for sealed concrete. These additional chemicals 505 can be used to create a variety of effects, such as a mottled effect. In an embodiment having additional chemicals, the amount of aqueous material 500 added to the dye material 100 is decreased by half and the additional chemicals are added in an amount equal to the amount of aqueous material 500.

As shown in FIG. 1, after mixing 1500 the dye material 100 to form the dye composition 1000, the dye composition 1000 should be agitated or shaken 1510 to encourage absorption of the dye material 100 by the aqueous material 500. The dye composition 1000 should be allowed to dissolve for approximately three hours prior to application. The dye composition 1000 should be agitated again 1520 prior to use to ensure adequate distribution of dye material 100 throughout the composition.

Dye composition 1000 can be applied 1530 to a variety of concrete surfaces after mixing. As will be appreciated by one in the art, concrete surfaces present a variety of finishes. Dye material 100 is suitable for use in a variety of concrete surfaces. These finishes include smooth finishes, polished finishes, splattered finishes, rough-floated finishes, broomed finishes, grooved finishes, stamped finishes, rubbed finishes, hammered aggregate finishes, exposed-stone finishes, and coarse-aggregate finishes. A benefit of the present invention is that the dye material 100 absorbs easily into the variety of possible surface finishes for concrete.

The invention has been described with reference to various specific and preferred embodiments and techniques. It will be understood, however, that reasonable modifications of such embodiments and techniques can be made while remaining within the spirit and scope of the invention.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A process for providing a dye material consisting of a mixture of azo and phthalocyanine dyes suitable for making colored and sealed concrete surfaces, said process consisting essentially of the following steps:
   (a) packaging said mixture of azo and phthalocyanine dyes as a non-hazardous powdered solute in a fluid-resistant container;
   (b) transporting said powdered solute to a work site;
   (c) on-site adding a portion of said powdered solute to a carrier containing an amount of at least one solvent including acetone;
   (d) mixing said portion of said powdered solute with said amount of at least one solvent to create a dye composition;
   (e) adding butyl cellosolve as a drying agent to said dye composition; and
   (f) applying said dye composition upon a concrete surface with an aerosol sprayer;
whereby said process allows said dye material to be easily transported without hazardous elements prior to mixture with said at least one solvent and wherein said butyl cellosolve from step (e) is used for making colored sealed concrete.

2. The process of claim 1 wherein step (c) further includes adding an equal portion of said powdered solute to an amount of at least one solvent.

3. The process of claim 1 wherein at least one solvent includes water.

4. The process of claim 1 wherein at least one solvent includes an amount of acetone and a amount of another solvent in equal parts.

5. A process of providing a dye material consisting of a mixture of azo and phthalocyanine dyes for making colored and sealed concrete surfaces, said process consisting essentially of the following steps:
   (a) packaging said mixture of azo and phthalocyanine dyes dye material as a non-hazardous powdered solute in a fluid-resistant container;
   (b) transporting said powdered solute to a work site;
   (c) adding a portion of said powdered solute to a carrier containing an amount of at least one chemical solvent including acetone;
   (d) mixing said portion of said powdered solute with said amount of at least one chemical solvent to create a dye composition;
   (e) agitating said dye composition to encourage absorption of said powdered solute with said at least one chemical solvent;
   (f) adding butyl cellosolve as a drying agent to said dye composition; and
   (g) applying said dye composition upon a concrete surface with an aerosol sprayer;
whereby said process allows said dye material to be easily transported without hazardous elements prior to mixture with said at least one chemical solvent and wherein said butyl cellosolve from step (f) is used for making colored sealed concrete.

6. The process of claim 5 wherein step (c) further includes adding an equal portion of said powdered solute to an amount of at least one chemical solvent.

7. The process of claim 5 wherein at least one chemical solvent includes an amount of acetone and an amount of another chemical solvent in equal parts.

8. A process of providing a dye material consisting of a mixture of azo and phthalocyanine dyes for colored and sealed concrete surfaces, said process consisting essentially of the following steps:
   (a) packaging multiple dye colors of said dye material consisting of a mixture of azo and phthalocyanine dyes separately as non-hazardous separate powdered solutes in a fluid-resistant container;
   (b) transporting said separate powdered solutes to a work site;
   (c) adding a portion of one of said powdered solute to a carrier containing an amount of water and acetone;

(d) mixing said portion of one of said powdered solute with said amount of water and acetone to create a dye composition (e) combining a portion of at least one different said separate powder solute to said dye composition to increase the amount of said powdered solute to a total powdered solute amount to crease a new color combination of due composition;

(f) agitating said dye composition to encourage absorption of said separate powdered solutes with said amount of water;

(g) adding butyl cellosolve as a drying agent to said dye composition; and (h) applying said dye composition upon a concrete surface with an aerosol sprayer;

whereby said process allows said dye material to be easily transported separate from any aqueous elements prior to mixture with said amount of water and wherein said butyl cellosolve from step (g) is used for making colored sealed concrete.

9. The process of claim 8 wherein step (c) further includes adding an equal portion of said powdered solute to said amount of water.

10. The process of claim 8 wherein said amount of water is one quart.

11. The process of claim 10 wherein said total powdered solute amount is approximately 8 grams to 16 grams.

12. The process of claim 8 wherein said amount of water is four quarts.

13. The process of claim 12 wherein said total powdered solute amount is approximately 42 grams to 50 grams.

14. The process of claim 8 wherein said amount of water is five gallons.

15. The process of claim 14 wherein said total powdered solute amount is approximately 226 grams to 234 grams.

* * * * *